United States Patent [19]

Adachi

[11] Patent Number: 4,922,291

[45] Date of Patent: May 1, 1990

[54] SHEET FEED DEVICE

[75] Inventor: Nobukazu Adachi, Tokyo, Japan

[73] Assignee: Canon Kabushiki Kaisha, Tokyo, Japan

[21] Appl. No.: 396,824

[22] Filed: Aug. 21, 1989

Related U.S. Application Data

[63] Continuation of Ser. No. 309,960, Feb. 9, 1989, abandoned, which is a continuation of Ser. No. 160,191, Feb. 25, 1988, abandoned.

[30] Foreign Application Priority Data

Feb. 27, 1987 [JP] Japan ................................ 62-046467

[51] Int. Cl.[5] ................................................ G03B 27/58

[52] U.S. Cl. ........................................ 355/72; 271/121; 271/167; 355/309

[58] Field of Search ................ 271/3.1, 121, 145, 162, 271/167, 152; 355/308, 309, 317, 321, 72

[56] References Cited

U.S. PATENT DOCUMENTS

| | | | |
|---|---|---|---|
| 4,017,181 | 4/1977 | Komaba et al. | 355/72 |
| 4,087,178 | 5/1978 | Pfeifer et al. | 355/72 |
| 4,227,800 | 10/1980 | Nezu | 355/72 |
| 4,279,504 | 7/1981 | Brown et al. | 355/72 |
| 4,469,431 | 9/1984 | Miyoshi et al. | 355/72 X |
| 4,472,049 | 9/1984 | Honma et al. | 355/354 X |
| 4,505,571 | 3/1985 | Kimura et al. | 355/354 |
| 4,553,831 | 11/1985 | Dixon | 355/72 X |
| 4,569,586 | 2/1986 | Koyama | 355/72 |
| 4,569,587 | 2/1986 | Miyoshi et al. | 355/72 |
| 4,621,272 | 11/1986 | Toriumi et al. | 355/72 X |
| 4,660,963 | 4/1987 | Stemmle | 355/72 X |

FOREIGN PATENT DOCUMENTS 49-38434 10/1974 Japan .

*Primary Examiner*—Richard A. Wintercorn

*Attorney, Agent, or Firm*—Fitzpatrick, Cella, Harper & Scinto

[57] ABSTRACT

A sheet containing member releasably attachable to a main body of a sheet feed device is provided with a member arranged to limit a movement of the sheets from the sheet containing member so that the sheets do not drop out of the sheet containing member when the sheet containing member is detached from the main body, and another member arranged to release the limiting of the movement when the sheet containing member is attached to the main body.

45 Claims, 6 Drawing Sheets

SHEET FEED DEVICE

This application is a continuation of application Ser. No. 07/309,960 filed Feb. 9, 1989, now abandoned which was a continuation of application Ser. No. 160,191 filed Feb. 25, 1988 also abandoned.

BACKGROUND OF THE INVENTION

1. Field of the Invention

This invention relates to sheet feed devices for use mainly in copiers, laser beam printers, facsimile devices, dot printers and ink-jet printers and other image forming apparatuses for producing images on sheets.

2. Description of the Related Art

Conventionally, the sheet feed device for the imaging forming apparatus described above has been made to operate with selection of interchangeable sheet cassettes of different size or paper quality according to necessity. As examples of the cassette mention may be made of one having a separation pawl as disclosed in U.S. Pat. No. 4,017,181, or another one without it as shown in Japanese Laid-Open Utility Model Application No. Sho 61-200838.

The prior known sheet feed device of the cassette without a type using the cassette without a separation pawl-less cassette will be described below.

In the past, an example of the sheet feed device for the copier or like image forming apparatus is shown generally at 1', having a feed roller 3 in cooperation with the releasably attached cassette 5', as shown in FIG. 6(*a*). Sheets S . . . stacked in the cassette 5' are fed one at a time in separation from the others by the feed roller 3 and a separation pad 6 positioned in confronting relation to the feed roller 3. Also, the cassette 5 is provided with a middle plate 7 bearing many sheets S . . . at once. The middle plate 7 is raised upward by a lifter 9 so that the top one of the sheets S . . . is pressed on the feed roller 3. Thus, the sheets S . . . are smoothly sent out in sequence.

By the way, because the remaining sheets S . . . in the cassette 5' continue being raised by the lifter 9, a certain number of sheets $S_1$, which are counted from the top, stand out from the upper edge of the front side wall 5'*a* of the cassette 5'. Therefore, when the cassette 5' is taken out of a main body 2 of the sheet feed device 1', the upper sheets $S_1$ are left behind in the main body 2 by the action of inertia or the like, and they later slip down from the cassette 5' (see FIGS. 6(*b*) and 6(*c*)).

With another type of cassette having the separation pawl, because the leading side edge of the sheet S is retained by the separation pawl, such a problem scarcely arises. But, if, as successive two or more of the sheets are partly overlapped with each other in going out, there remain a number of sheets overrunning the separation pawl, these remaining sheets will occasionally slip down from the cassette when it is taken out.

SUMMARY OF THE INVENTION

An object of the invention is to provide a sheet feed device which enables exchanging of sheets to be carried out smoothly.

Another object is to provide a sheet feed device capable of preventing sheets from slipping down from sheet containing means when the sheet containing means is detached from the sheet feed device.

To achieve such objects, according to the invention, the sheet feed device is provided with movement limiting means for limiting the relative movement between the sheets and the sheet containing means only when the sheet containing means is moved from the sheet feeding position.

DETAILED DESCRIPTION OF THE PREFERRED EMBODIMENTS

Figure 1:
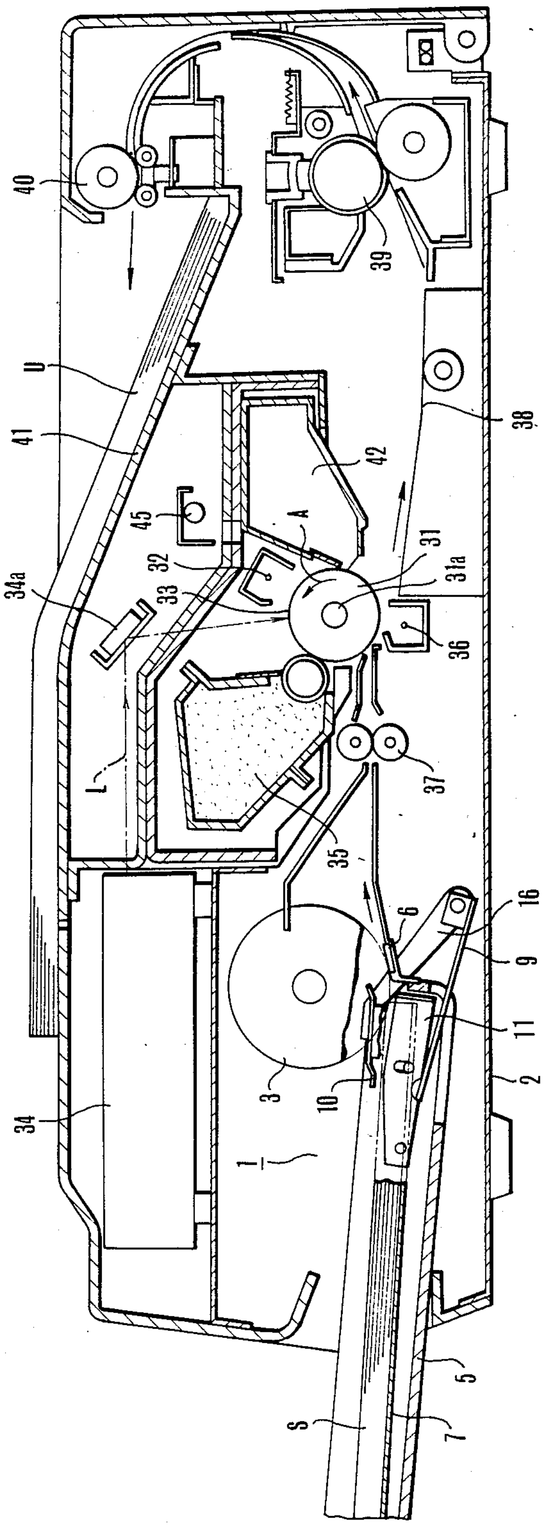
FIG. 1 is a sectional view of an embodiment of a sheet feed device according to the invention applied to a laser beam printer.

FIG. 1 shows a laser beam printer as an example of the image forming apparatus to which the sheet feed device of the invention is applied.

A photosensitive drum 31 serving as an image bearing member rotates about a shaft 31*a*. In the course of rotation, the drum 31 is uniformly charged to the positive or negative polarity in its peripheral surface by a charger 32. Then, in an exposure portion 33, the drum 31 is scanned by a laser beam L issued from a laser scanner 34 and reflected by a mirror 34*a*, so that an electrostatic latent image of the subject image is formed on its peripheral surface. The electrostatic latent image formed on the surface of the photosensitive drum 31 is developed with a toner by a developer 35 and comes to a confronting position to a transfer discharger 36.

Meanwhile, the sheet S is sent out from the sheet feed device 1, and, after its leading side edge has once been latched by a registration roller 37, starts to enter between the photosensitive drum 31 and the transfer discharger 36 at a predetermined timing synchronized with the toner image formed on the photosensitive drum 31. The toner image is then being transferred serially to the surface of the sheet S.

The toner image-transferred sheets S are separated serially from the surface of the drum 31 by a separation member (not shown), going along a guide 38 to a fixing device 39, where the image is fixed. Then, each sheet S is expelled as an image-formed member U by a delivery roller 40 to a copy tray portion 41.

The surface of each drum 31 from which the sheet S has been separated is cleansed by a cleaner 42 to remove the residual toner, and is pre-exposed by a preconditioning lamp 45 to make ready for the next exposure.

Figure 2A:
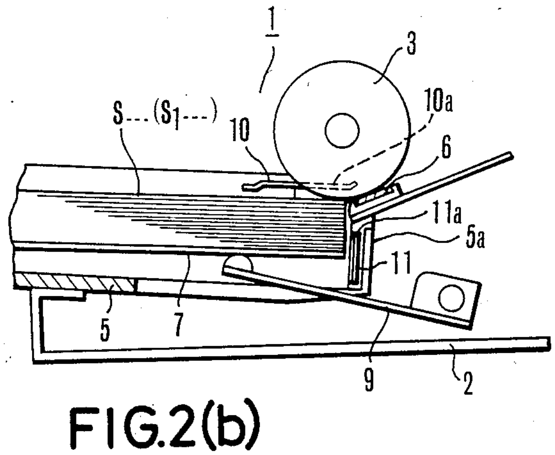
FIGS. 2(*a*)-2(*c*) are fragmentary side sectional views of the sheet feed device of the invention with the cassette in three positions where the cassette is loaded on the sheet feed device, about to be detached, and fully detached from the sheet feed device, respectively.
Figure 2B:
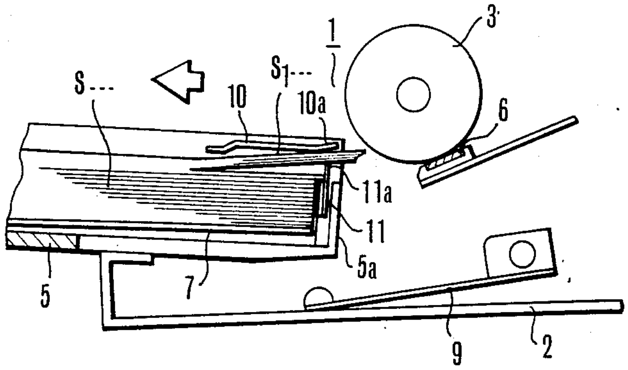
Figure 2C:
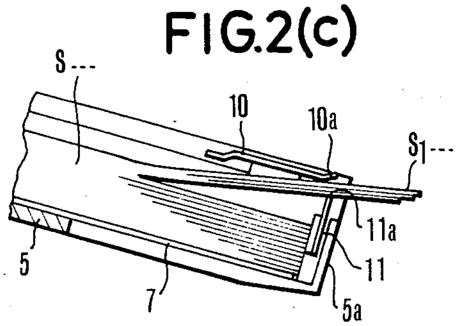

Next, an embodiment of the sheet feed device according to the invention is described in detail by reference to FIGS. 1 and 2(*a*)-2(*c*).

Figure 3:
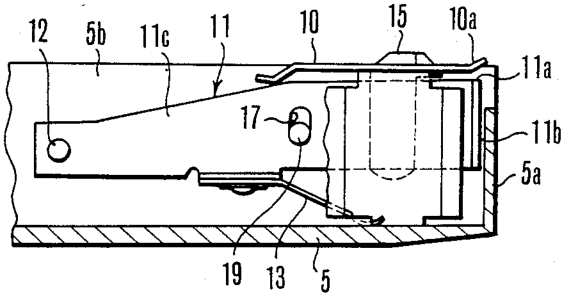
FIG. 3 is a side sectional view of the front part of the cassette.
Figure 4:
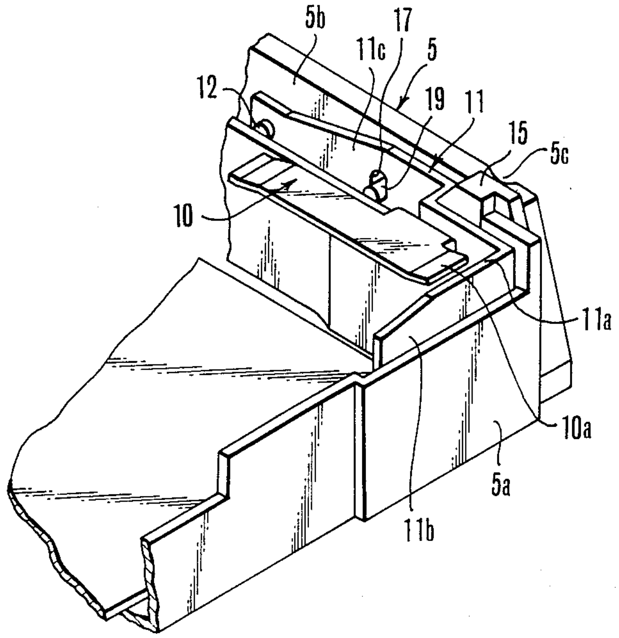
FIG. 4 is a perspective view of that front part.
Figure 5:
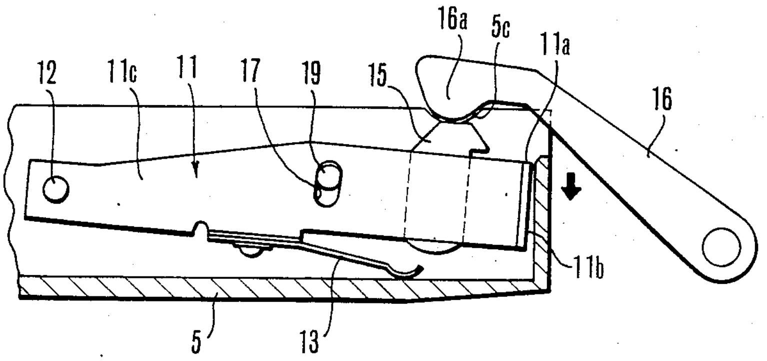
FIG. 5 is a side sectional view of the cassette with a shutter in the pushed position.
Figure 6A:
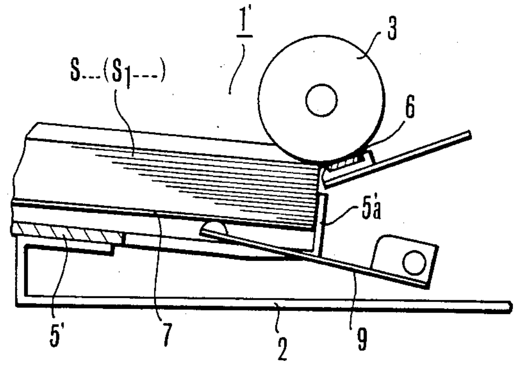
FIGS. 6(*a*)-6(*c*) are side sectional views of the prior known sheet feed device with FIG. 6(*a*) illustrating the sheet feed device when the cassette is loaded, FIG. 6(*b*) illustrating the cassette just after detachment from the sheet feed device, and FIG. 6(*c*) illustrating the cassette as fully detached from the sheet feed device.
Figure 6B:
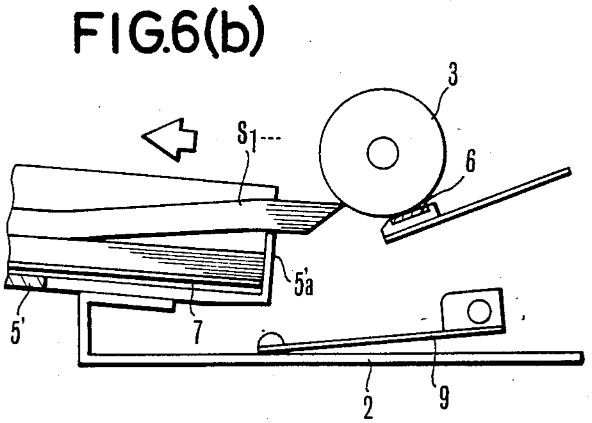
Figure 6C:
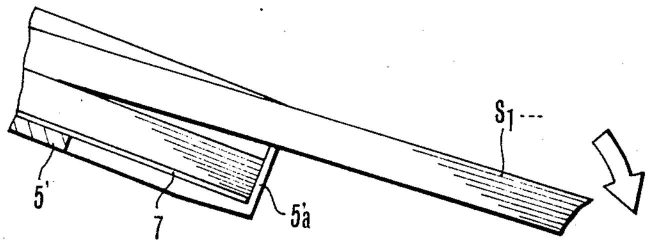

The sheet feed device 1 has the cassette 5 releasably attached thereto in the opposite position to the feed roller 3. The cassette 5 is provided with a sheet stopper 10 constituting a first sandwiching member, and a shutter 11 or extruding member constituting a second sandwiching member. An edge 11*a* of the front portion of the shutter 11 is arranged to face the sheet stopper 10 which is fixed to the cassette 5. The shutter 11 as shown in greater detail in FIG. 3 which, in the side sectional view, illustrates the front part of the cassette 5 and in FIG. 4 which is a perspective view of that front part, has a front portion 11*b* confronting the front wall 5*a* of the cassette 5, and also has a body 11*c* pivotally supported by a fulcrum pin 12 on the side wall 5*b* of the cassette 5. A leaf spring 13 is fixed at its one end to the lower portion of the shutter body 11*c*, urging the shutter 11 so as to resiliently move upward. Further, the shutter 11 is provided with a shutter movement cam 15. When the cassette 5 is loaded in the sheet feed device main body 2, the cam 15 is pushed by a head camming surface 16*a* of a position determining arm 16 provided in the device main body 2, so that the shutter 11 is pushed down against a spring 13 until the head camming surface 16*a* of the position determining arm 16 falls in a groove 5*c* of the cassette 5, as shown in FIG. 5. On the other hand, when the cassette 5 is taken out, the shutter 11 is released from the depression of the position determining arm 16 and is resiliently moved upward by the spring 13 until the lower end of a slot 17 of the shutter 11 abuts on a stopper pin 19, so that the upper edge 11*a* of the front portion of the shutter 11 protrudes toward the sheet stopper 10, as shown in FIG. 3.

Since this embodiment has the features described above, when the cassette 5 is loaded in the sheet feed device main body 2, the sheets S contained in the cassette 5 are raised by the lifter 9 and the upper sheets $S_1$ are pressed against the feed roller 3. By the feed roller 3 and the separation pad 6, the sheets $S_1$ are sent out one by one in separation. During this time, the upper sheets $S_1$ contained in the cassette 5 take their positions above the front wall 5*a* of the cassette 5, and the shutter 11 is pushed by the camming surface of the position determining arm 16 so that the front upper edge 11*a* of the shutter 11 lies down so as not to hinder sending-out of the sheet (see FIG. 2(*a*)).

Meanwhile, when the cassette 5 is taken out of the sheet feed device main body 2, the shutter 11 is released from the depression of the position determining arm 16 and protrudes the front upper edge 11*a* resiliently toward the sheet stopper 10, so that the upper sheets $S_1$ which have so far partly slipped off the cassette 5 by inertia or the like are caught by being sandwiched in between the front upper edge 11*a* and the sheet stopper 10. Therefore, even when the cassette 5 is pulled out or taken out from the sheet feed device main body 2, the sheets S contained in the cassette 5 never fly out from the cassette 5 to be scattered (see FIG. 2(*c*)).

It should be noted though that, in the above-described embodiment, the front upper edge 11*a* of the shutter 11 has been made to move toward the sheet stopper 10 which has been positioned above the shutter 11 to sandwich the sheets $S_1$ therebetween, the invention is not confined thereto. The shutter 11 may be made to move from above to below. Also, two movable shutters may be used as arranged on either vertical side of the mouth of the cassette to protrude in such a way as to approach each other.

Also, though the shutter 11 has been made to be controlled by the position determining arm 16, the invention is not confined thereto. It may be controlled by any other member than the position determining arm.

Further, though the protruded sheets $S_1$ . . . have been sandwiched at a portion of the front wall 5*a* of the cassette 5, the invention is not confined thereto. The sandwiching may be done at, for example, the center of the cassette 5.

Also, a pressor member may be made to move from above to below to press the upper surface of the sheet. In this case, the sheets are sandwiched between the pressor member and the middle plate 7.

Figure 7:
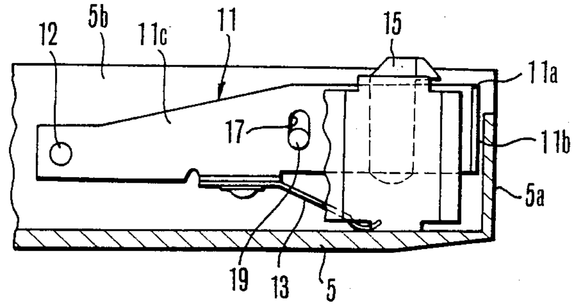
FIG. 7 is a side sectional view of an example of variation of the cassette shown in FIG. 3.

Further, as shown in FIG. 7, the sheet stopper 10 may be omitted and the shutter 11 may be made to protrude to a position opposite to the edges of the sheets so that the sheets are limited from moving.

In addition, in the shutter 11 shown in FIG. 3, the lower end of the slot 17 abuts on the stopper pin 19, so that there is a little space between the front upper edge 11*a* and the sheet stopper 10. However, the front upper edge 11*a* may abut on the sheet stopper 10 to stop the shutter 11 moving upward. Essentially, the sheet stopper 10 and the shutter front upper edge 11*a* may take up their positions to sandwich the sheets S.

What is claimed is:

1. A sheet feed device comprising:

sheet containing means for containing sheets, said sheet containing means being movable in a predetermined direction from a predetermined position;

feed means for sending out the sheets contained in said sheet containing means disposed in said predetermined position; and movement limiting means for limiting said sheets from making a relative movement to a direction reverse to said predetermined direction relative to said sheet containing means only when said sheet containing means is moved from the predetermined position.

2. A device according to claim 1, wherein said sheet containing means includes a cassette.

3. A device according to claim 2, wherein said sheet containing means has pressing means for pressing the sheets on said feed means.

4. A device according to claim 1, wherein said feed means has a roller coming into contact with a surface of one of the sheets.

5. A device according to claim 4, wherein said feed means has separation means arranged opposite to said roller to come into frictional contact with a sheet sent out by said roller for separating the sheet.

6. A device according to claim 1, wherein said movement limiting means has a pressure-contact member arranged to come into pressure contact with the sheets for limiting a movement of the sheets relative to said sheet containing means.

7. A device according to claim 6, wherein said movement limiting means has a spring member for applying a bias force for pressing said pressure-contact member on the sheets.

8. A device according to claim 7, wherein said movement limiting means has release means for releasing the pressure contact of said pressure-contact member on the sheets against the bias force of said spring member when said sheet containing means is disposed in said predetermined position.

9. A device according to claim 1, wherein said movement limiting means has first and second members arranged so that when said sheet containing means has been moved from said predetermined position, at least one of said first and said second members moves in a direction to approach another to sandwich the sheets between said first and said second members, so that the sheets move integrally with said sheet containing means.

10. A device according to claim 9, wherein said first member is fixed in a position facing an upper surface of the sheets contained in said sheet containing means.

11. A device according to claim 9, wherein said second member is movable in a direction to approach said first member, and said movement limiting means has a spring member for urging said second member in the direction to approach said first member.

12. A device according to claim 11, wherein said movement limiting means has detaching means for detaching said second member from said first member against a bias force of said spring member when said sheet containing means is disposed in said predetermined position.

13. A device according to claim 12, wherein said detaching means has a camming surface arranged to come into contact with said second member to move said second member.

14. A sheet feed device comprising:

sheet containing means for containing sheets, said sheet containing means being disposed in a feeding position capable of sending out the contained sheets and being able to move in a predetermined direction from said feeding position;

feed means for sending out the sheets from said sheet containing means disposed in said feeding position; and movement limiting means having an extruding member which protrudes the neighborhood of a rear end of the sheets contained in said sheet containing means relative to said predetermined direction for limiting the relative movement between the sheets and the sheet containing means when said sheet containing means is moved in said predetermined direction.

15. A device according to claim 14, wherein said feed means has a roller for coming into contact with a surface of one of the sheets.

16. A device according to claim 15, wherein said feed means has separation means arranged opposite to said roller to come into frictional contact with a sheet sent out by said roller for separating the sheet.

17. A device according to claim 16, wherein said movement limiting means has a spring member for urging said extruding member in a direction to protrude.

18. A device according to claim 17, wherein said movement limiting means has retracting means for retracting said extruding member against a bias force of said spring member when said sheet containing means is disposed in said feeding position.

19. A device according to claim 18, wherein said retracting means has a camming surface arranged to come into contact with said extruding member for retracting said extruding member according to the movement of said sheet containing means to said feeding position.

20. An image forming apparatus comprising:

sheet containing means for containing sheets, said sheet containing means being disposed in a feeding position capable of sending out the contained sheets, and being movable in a predetermined direction from said feeding position;

feed means for sending out the sheets contained in said sheet containing means disposed in said feeding position;

image forming means for forming an image on each of the sheets sent out by said feed means;

limiting means for limiting the relative movement of the sheets to a direction reverse to said predetermined direction relative to said sheet containing means only when said sheet containing means is moved from said feeding position; and releasing means for releasing the limitation by said limiting means when said sheet containing means is disposed at said feeding position.

21. A device according to claim 20, wherein said movement limiting means has a pressure member arranged to come into pressure contact with the sheets for limiting a movement of the sheets.

22. A device according to claim 20, wherein said movement limiting means has first and second members arranged so that when said sheet containing means-has been moved from said feeding position, at least one of said first and said second members moves in a direction to approach another to sandwich the sheets between said first and said second members, so that the sheets move integrally with said sheet containing means.

23. A sheet feed device comprising:

a sheet containing member for containing sheets and being movable to a predetermined direction from a predetermined feeding position;

a feed member for sending out said sheets contained in said sheet containing member to a direction reverse to said predetermined direction when said sheet containing member is disposed at said feeding position; and an extruding member for protruding rearwardly relative to said predetermined direction of the sheets contained in said sheet containing member thus limiting the relative movement between the sheets and the sheet containing member when said sheet containing member is moved from said sheet feeding position to said predetermined direction.

24. A sheet feed device according to claim 23, wherein said sheet containing member includes a cassette.

25. A sheet feed device according to claim 23, further comprising a pressure member for pressing the sheets contained in said sheet containing member against said feed member.

26. A sheet feed device according to claim 23, wherein said feeding member includes a roller or rollers.

27. A sheet feed device according to claim 26, further comprising a friction member which makes a pressure contact with said roller or rollers for separating the sheets.

28. A sheet feed device according to claim 23, further comprising releasing means for releasing the limitation by said extruding member when said sheet containing member is disposed at said feeding position.

29. A sheet feed device according to claim 23, further comprising a movement limiting member for limiting an upward movement of the sheets contained in said sheet containing member in the neighborhood of said extruding member.

30. A sheet feed device according to claim 23, wherein said extruding member limits the relative movement of the sheets and the sheet containing member by abutting on the ends of said sheets when it protrudes.

31. A sheet feed device according to claim 23, further comprising a sandwiching member which sandwiches the sheets in cooperation with said extruding member when the extruding member protrudes, thereby limiting the relative movement of the sheets and the sheet containing member.

32. A sheet feed device according to claim 30, further comprising a sandwiching member for sandwiching sheets which have exceeded said extruding member in cooperation with the extruding member when said extruding member protrudes, thereby limiting the relative movement of said sheets exceeding the extruding member relative to said sheet containing member.

33. A sheet feed device comprising:

sheet containing means for containing sheets, said sheet containing means being movable in a predetermined direction from a predetermined position;

feed means for sending out the sheets contained in said sheet containing means disposed in said predetermined position; and moving means which moves in response to the movement of said sheet containing means when said sheet containing means is moved from said predetermined position to shift the sheet in said predetermined direction together with said sheet containing means.

34. A sheet feed device according to claim 33, further comprising has a pressing member for pressing the sheet contained in said sheet containing means onto said feed means.

35. A sheet feed device according to claim 33, wherein said feed means has a rotating member which contacts the sheet to give it transferring force.

36. A sheet feed device according to claim 35, which further comprises a friction member which is pressed onto said rotating member to separate the sheet therefrom.

37. A sheet feed device according to claim 33, wherein said moving means projects into the feed path of the sheet when said sheet containing means is moved in said direction.

38. A sheet feed device according to claim 33, wherein said moving means moves the sheet in said direction by contacting the sheet protruding from said sheet containing means.

39. A sheet feed device comprising:

sheet containing means for containing sheets, said sheet containing means being movable in a predetermined direction from a predetermined position;

feed means for sending out the sheets contained in said sheet containing means disposed in said predetermined position; and preventing means which protrudes into the feed path of the sheet when said sheet containing means is moved from said predetermined position and contacts the sheet protruding from said sheet containing means to prevent the sheet from falling down therefrom.

40. A sheet feed device according to claim 39, further comprising has pressing means for pressing the sheet contained in said sheet containing means onto said feed means.

41. A sheet feed device according to claim 39, wherein said feed means has a rotating member which contacts the sheet to give transferring force thereto.

42. A sheet feed device according to claim 39, wherein said feed means has a roller which contacts the sheet to give transferring force thereto.

43. A sheet feed device according to claim 42, wherein further comprises separating means for separating the sheet by co-operation with said roller.

44. A sheet feed device according to claim 43, wherein said separating means has a friction member.

45. A sheet feed device according to claim 39, which further comprises retracting means for retracting said preventing means from the feed path when said sheet containing means is at the predetermined position.

* * * * *

UNITED STATES PATENT AND TRADEMARK OFFICE
CERTIFICATE OF CORRECTION

PATENT NO. : 4,922,291

DATED : May 1, 1990

INVENTOR(S) : NOBUKAZU ADACHI

It is certified that error appears in the above-identified patent and that said Letters Patent is hereby corrected as shown below:

COLUMN 1

Line 16, "imaging" should read --image--.
Line 25, "cassette" should be deleted.
Line 26, "without a" (first occurrence) should be deleted.
Line 27, "-less cassette" should be deleted

COLUMN 2

Line 60, "each drum 31" should read --the drum 31-- and "the sheet S" should read --each sheet S--.

COLUMN 3

Line 51, "in" should be deleted.

COLUMN 6

Line 20, "means-has" should read --means has--.
Line 31, "to" should read --in--.
Line 41, "to" should read --in--.
Line 50, "feeding member" should read --feed member--.

COLUMN 7

Line 31, "has" should be deleted.

UNITED STATES PATENT AND TRADEMARK OFFICE

CERTIFICATE OF CORRECTION

PATENT NO. : 4,922,291

DATED : May 1, 1990

INVENTOR(S) : NOBUKAZU ADACHI

It is certified that error appears in the above-identified patent and that said Letters Patent is hereby corrected as shown below:

COLUMN 8

Line 23, "has" should be deleted.
Line 33, "wherein further comprises" should read --further comprising--.

Signed and Sealed this

Twentieth Day of August, 1991

*Attest:*

HARRY F. MANBECK, JR.

*Attesting Officer*

*Commissioner of Patents and Trademarks*